(12) United States Patent
Yun et al.

(10) Patent No.: US 11,283,657 B2
(45) Date of Patent: Mar. 22, 2022

(54) DEVICE AND METHOD FOR PROCESSING RECEIVED SIGNAL IN WIRELESS COMMUNICATION SYSTEM

(71) Applicants: Samsung Electronics Co., Ltd., Suwon-si (KR); Postech Academy-Industry Foundation, Pohang-si (KR)

(72) Inventors: Yeohun Yun, Hwaseong-si (KR); Joon Ho Cho, Seoul (KR); Jubum Kim, Seoul (KR); Chanhong Kim, Suwon-si (KR); Jongbu Lim, Seoul (KR); Sungnam Hong, Suwon-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 0 days.

(21) Appl. No.: 16/636,131

(22) PCT Filed: Aug. 3, 2018

(86) PCT No.: PCT/KR2018/008839
§ 371 (c)(1),
(2) Date: Feb. 3, 2020

(87) PCT Pub. No.: WO2019/027284
PCT Pub. Date: Feb. 7, 2019

(65) Prior Publication Data
US 2021/0168002 A1      Jun. 3, 2021

(30) Foreign Application Priority Data
Aug. 3, 2017   (KR) .................. 10-2017-0098363

(51) Int. Cl.
*H04L 27/22* (2006.01)

(52) U.S. Cl.
CPC ................................ *H04L 27/22* (2013.01)

(58) Field of Classification Search
CPC . H04L 27/22; H04L 27/2614; H04L 27/2647; H04L 27/2649; H04L 27/26524;
(Continued)

(56) References Cited

U.S. PATENT DOCUMENTS

| | | | |
|---|---|---|---|
| 7,738,572 B2 * | 6/2010 | Lin ..................... | H04L 27/2647 375/260 |
| 8,184,753 B2 * | 5/2012 | Kang .................. | H04L 27/2647 375/350 |

(Continued)

FOREIGN PATENT DOCUMENTS

WO      2010004586 A2      1/2010

OTHER PUBLICATIONS

International Search Report and Written Opinion regarding Intenational Application No. PCT/KR2018/008839, dated Oct. 24, 2018, 12 pages.

(Continued)

*Primary Examiner* — Betsy Deppe

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method of a reception device in a wireless environment according to various embodiments of the present disclosure may include receiving a signal from a transmission device, identifying that the received signal is modulated based on at least one designated modulation scheme of modulation schemes, based on identifying, generating second values by applying a first circular shift of a first direction to first values relating to first symbols of the signal, and generating third values by applying a second circular shift of a second direction which (Continued)

is different from the first direction, to complex conjugate values of the first values, generating second symbols of the signal based at least in part on the second values and the third values, and obtaining data about the signal based at least in part on the second symbols.

20 Claims, 8 Drawing Sheets

(58) Field of Classification Search
CPC .......... H04L 27/26526; H04L 27/2697; H04B 7/0413; H04B 7/08
See application file for complete search history.

(56) References Cited

U.S. PATENT DOCUMENTS

| | | | |
|---|---|---|---|
| 2007/0026833 A1* | 2/2007 | Kuchi | H04L 25/03299 455/296 |
| 2011/0129029 A1 | 6/2011 | Liu et al. | |
| 2014/0192925 A1 | 7/2014 | Li | |
| 2015/0341190 A1 | 11/2015 | Cipriano et al. | |
| 2017/0195078 A1 | 7/2017 | Chang et al. | |

OTHER PUBLICATIONS

Qualcomm Incorporated, "On UL diversity transmission scheme", 3GPP TSG RAN WG1 Meeting #89, R1-1708583, May 2017, 11 pages.

Korean Intellectual Property Office, "Notice of Patent Grant" in connection with Korean Patent Application No. 10-2017-0098363, dated Sep. 29, 2021, 4 pages.

* cited by examiner

DEVICE AND METHOD FOR PROCESSING
RECEIVED SIGNAL IN WIRELESS
COMMUNICATION SYSTEM

CROSS-REFERENCE TO RELATED
APPLICATIONS

This application is a 371 National Stage of International Application No. PCT/KR2018/008839 filed Aug. 3, 2018, which claims priority to Korean Patent Application No. 10-2017-0098363 filed Aug. 3, 2017, the disclosures of which are herein incorporated by reference in their entirety.

BACKGROUND

1. Field

The present disclosure relates generally to a wireless environment system. More particularly, the present disclosure relates to an apparatus and a method for processing a received signal in the wireless environment system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Processing for lowering a peak-to-average power ratio (PAPR) is applied to a signal transmitted in a wireless environment. Such processing may increase complexity of a receiver of a reception device. In this regard, a solution for reducing the complexity of the receiver of the reception device is demanded.

SUMMARY

To address the above-discussed deficiencies of the prior art, it is a primary aspect of the present disclosure to provide an apparatus and a method for processing a received signal in a wireless environment.

Another aspect of the present disclosure is to provide an apparatus and a method for reducing a peak-to-average power ratio (PAPR) in a wireless environment.

Yet another aspect of the present disclosure is to provide an apparatus and a method for reducing complexity of a receiver.

The technical problem to be achieved in the present disclosure is not limited to the technical problem mentioned above, and other technical problems not mentioned above are clearly understood by those skilled in the art from the following description.

According to one aspect of the present disclosure, a reception device in a wireless environment may include at least one receiver, and at least one processor operatively coupled with the at least one receiver and configured to receive a signal from a transmission device, to identify that the received signal is modulated based on at least one designated modulation scheme of modulation schemes, based on identifying, to generate second values by applying a first circular shift of a first direction to first values relating to first symbols of the signal, and to generate third values by applying a second circular shift of a second direction which is different from the first direction, to complex conjugate values of the first values, to generate second symbols of the signal based at least in part on the second values and the third values, and to obtain data about the signal based at least in part on the second symbols.

According to another aspect of the present disclosure, a method of a reception device in a wireless environment may include receiving a signal from a transmission device, identifying that the received signal is modulated based on at least one designated modulation scheme of modulation schemes, based on identifying, generating second values by applying a first circular shift of a first direction to first values relating to first symbols of the signal, and generating third values by applying a second circular shift of a second direction which is different from the first direction, to complex conjugate values of the first values, generating second symbols of the signal based at least in part on the second values and the third values, and obtaining data about the signal based at least in part on the second symbols.

A receiving device and method according to various embodiments of the present disclosure may reduce the complexity of the operation required for receiving a signal by applying at least one cyclic shift to values associated with symbols for a signal received from the transmitting device.

Effects which can be acquired by the disclosure are not limited to the above described effects, and other effects that have not been mentioned may be clearly understood by those skilled in the art from the following description.

DETAILED DESCRIPTION

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings equal to the contextual meanings in the relevant field of art, and are not to be interpreted to have ideal or excessively formal meanings unless clearly defined in the present disclosure. In some cases, even where a term is defined in the present disclosure, it should not be interpreted to exclude embodiments of the present disclosure.

In various embodiments of the present disclosure to be described below, a hardware approach will be described as an example. However, since the various embodiments of the present disclosure include a technology using both hardware and software, the present disclosure does not exclude a software-based approach.

The present disclosure provides an apparatus and a method for processing a received signal in a wireless environment system.

Terms indicating mathematical expressions (e.g., matrix, vector) of a signal, terms indicating mathematical expressions (e.g., integer, zero, non-integer) of a signal value, and capacity (e.g., IF capacity, IF effective capacity, transmission capacity, channel capacity), terms indicating network entities, and terms indicating components of a device are mentioned for the sake of explanations. Accordingly, the present disclosure is not limited to the terms to be described, and may use other terms having technically identical meaning.

In addition, the present disclosure describes various embodiments using terms used in some communication standards (e.g., 3rd generation partnership project (3GPP)) for the sake of explanations. Various embodiments of the present disclosure may be easily modified and applied to other communication system.

Figure 1:
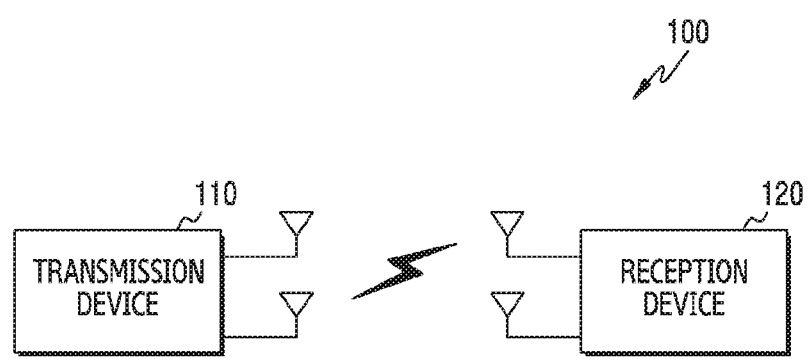
FIG. 1 illustrates a communication environment according to various embodiments of the present disclosure.

FIG. 1 illustrates a wireless communication environment according to various embodiments of the present disclosure.

FIG. 1 depicts a transmission device 110 and a reception device 120, as part of nodes which use a wireless channel in the wireless communication environment.

Figure 2:
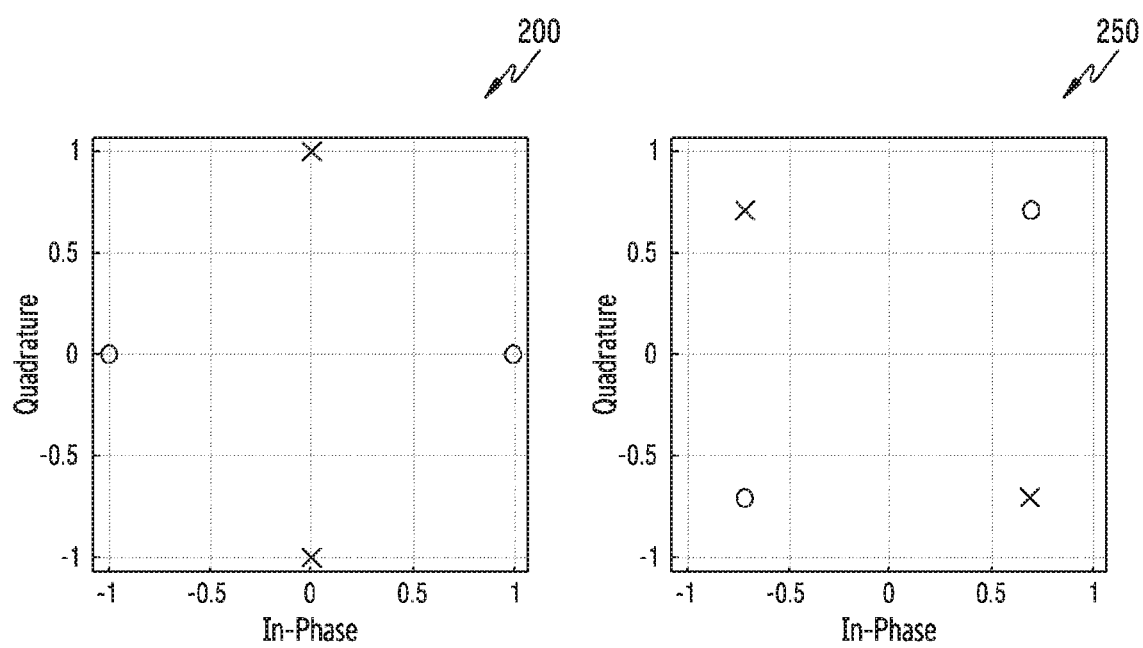
FIG. 2 illustrates constellation examples of π/2 binary phase shift keying (BPSK)
Figure 3:
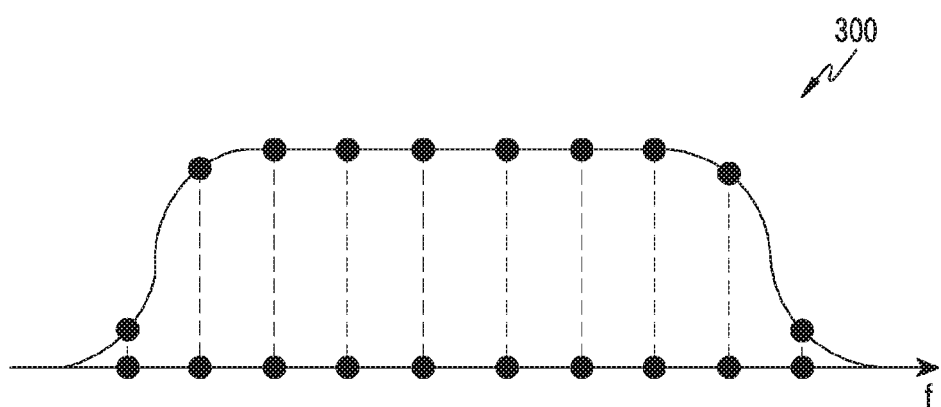
FIG. 3 illustrates an example of frequency domain spectrum shaping (FDSS)

FIG. 2 illustrates constellation examples of π/2 binary phase shift keying (BPSK). FIG. 3 illustrates an example of frequency domain spectrum shaping (FDSS).

Referring to FIG. 1, the wireless communication environment 100 may include the transmission device 110 and the reception device 120. The transmission device 110 may transmit a signal to the reception device 120.

The transmission device 110 and the reception device 120 are divided according to a signal transmission direction. Hence, one device may operate as the transmission device 110 or the reception device 120 according to a situation. For example, in downlink communication, the transmission device 110 may be a base station and the reception device 120 may be a terminal. For example, in uplink communication, the transmission device 110 may be a terminal and the reception device 120 may be a base station. In device-to-device (D2D) communication, the transmission device 110 may be a terminal and the reception device 120 may be another terminal. Herein, the D2D communication may be referred to as sidelink communication. The transmission device 110 may be a base station and the reception device 120 may be another base station. In some embodiments, the transmission device 110 and the reception device 120 may perform signaling over backhaul. The backhaul may be wireless backhaul. Besides, the transmission device 110 and the reception device 120 may be other various devices.

Herein, the base station is a network infrastructure which provides radio access to the terminal. The base station may be referred to as an access point (AP), an eNodeB (eNB), a 5th generation node (5G node), a 5G nodeB (NB), a wireless point, a transmission/reception point (TRP), or other technically equivalent term.

Herein, the terminal is a device used by a user and communicates with the base station over a wireless channel. In some cases, the terminal may be operated without user's involvement. That is, the terminal is a machine-type communication (MTC) device, and may not be carried by the user. The terminal may be referred to as a user equipment (UE), a mobile station, a subscriber station, a remote terminal, a wireless terminal, an electronic device, a user device, or other technically equivalent term.

A signal received at the reception device 120 may be expressed as Equation 1.

$$Y=HX+Z \tag{1}$$

Y denotes the signal received at the reception device 120, and X denotes a signal transmitted by the transmission device 110. H denotes a channel between the transmission device 110 and the reception device 120. Z denotes noise of the channel. If the transmission device 110 includes $N_T$-ary antennas and the reception device 120 includes $N_R$-ary antennas, X may be a $N_T \times 1$ vector, Y and Z may be a $N_R \times 1$ vector, and H may be a $N_R \times N_T$ matrix.

While the transmission device and the reception device are divided in FIG. 2 through FIG. 10 to ease the understanding, functions of the device are not limited by the name. In other words, the reception device 120 may, if necessary, transmit not only control information (e.g., channel information) but also data to the transmission device.

In various embodiments, the transmission device 110 may process a signal to reduce a peak-to-average power ratio (PAPR) and then transmit the processed signal to the reception device 120.

In some embodiments, to reduce the PAPR, the transmission device 110 may modulate the signal based on BPSK shifted by π/2 (hereafter, referred to as π/2 BPSK). For example, the π/2 BPSK may be represented as a constellation 200 of FIG. 2. In the constellation 200, a horizontal axis may indicate a real component (in-phase) and a vertical axis may indicate an imaginary component (quadrature). In the constellation 200, points (e.g., (I, Q)=(1, 0), (I, Q)=(−1, 0)) marked by 'o' may indicate first symbols, and points (e.g., (I, Q)=(0, 1), (I, Q)=(0, −1)) marked by 'x' may indicate second symbols which are different from the first symbols. For example, the π/2 BPSK may be represented as a constellation 250 of FIG. 2. In the constellation 250, a horizontal axis may indicate the real component and a vertical axis may indicate the imaginary component. In the constellation 250, points (e.g., (I, Q)=(1/√2, 1/√2), (I, Q)=

$(-1/\sqrt{2}, -1/\sqrt{2}))$ marked by 'o' may indicate the first symbols, and points (e.g., (I, Q)=$(-1/\sqrt{2}, 1/\sqrt{2})$, (I, Q)=$(1/\sqrt{2}, -1/\sqrt{2})$) marked by 'x' may indicate the second symbols which are different from the first symbols. The transmission device 110 may transmit the signal modulated based on the π/2 BPSK, to the reception device 120.

In some embodiments, to reduce the PAPR, the transmission device 110 may apply FDSS to the signal and then transmit the FDSS-processed signal to the reception device 120. For example, the transmission device 110 may transmit a signal to the reception device 120 by applying a weight or a gain to subcarriers to be allocated to the reception device 120 as shown in a conceptual diagram of FIG. 3.

Figure 4:
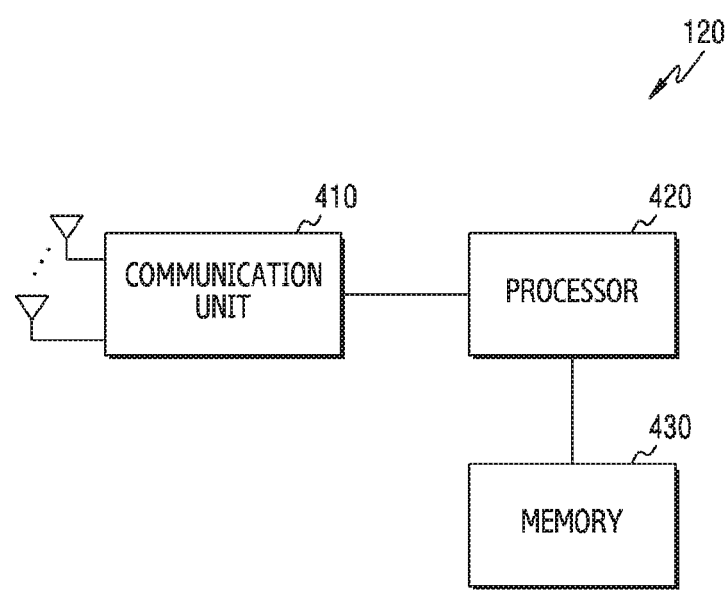
FIG. 4 illustrates a functional configuration of a reception device in a wireless environment system according to various embodiments of the present disclosure.

FIG. 4 illustrates a functional configuration of a reception device in a wireless environment system according to various embodiments of the present disclosure. The configuration of FIG. 4 may be construed as the configuration of the reception device 120 of FIG. 1. A term such as 'portion' or '~er' used in the following indicates a unit for processing at least one function or operation, and may be implemented using hardware, software, or a combination of hardware and software. Functions of the device are not limited by its name as mentioned above, and the following explanations describe the reception device 120 which not only receives a signal from the transmission device 110 of FIG. 1 but also transmits a signal to the transmission device 110.

Referring to FIG. 4, the reception device 120 may include a communication unit 410, a processor 420, and a memory 430.

The communication unit 410 may transmit and receive signals over a wireless channel. For example, the communication unit 410 may perform a conversion function between a baseband signal and a bit sequence according to a physical layer standard of the system. For example, in control information transmission, the communication unit 410 generates modulation symbols by encoding and modulating a transmit bit sequence. Also, in data reception, the communication unit 410 may restore a receive bit sequence by demodulating and decoding a baseband signal. Further, the communication unit 410 may up-convert the baseband signal to a Radio Frequency (RF) band signal, transmit it via an antenna, and down-convert an RF band signal received via an antenna to a baseband signal. For example, the communication unit 410 may include a decoder, a demodulator, an analog-to-digital Convertor (ADC), a receive filter, an amplifier, a mixer, an oscillator, and so on. For the signal transmission, the communication unit 410 may further include an encoder, a modulator, a digital-to-analog convertor (DAC), a transmit filter, and so on.

The communication unit 410 may include a plurality of antennas. The communication unit 410 may receive a plurality of streams over the antennas respectively. The communication unit 410 may include a plurality of RF chains. Further, the communication unit 410 may perform beamforming. For the beamforming, the communication unit 410 may control a phase and an amplitude of signals transmitted/received over the antennas or antenna elements, that is, conduct analog beamforming. Alternatively, the communication unit 410 may beamform a digital signal, that is, conduct digital beamforming.

The communication unit 410 may include different communication modules for processing signals of different frequency bands. Further, the communication unit 410 may include a plurality of communication modules to support different radio access techniques. For example, different radio access techniques may include Bluetooth low energy (BLE), wireless fidelity (Wi-Fi), WiFi gigabyte (WiGig), and a cellular network (e.g., Long Term Evolution (LTE), LTE-Advanced (LTE-A), 5G network). The different frequency bands may include a super high frequency (SHF) (e.g., 2.5 GHz, 5 GHz) band and a millimeter weave (e.g., 30 GHz, 60 GHz) band.

As such, the communication unit 410 transmits and receives the signals. Hence, the communication unit 410 may be referred to as a transmitter, a receiver, or a transceiver. Hereafter, the transmission and the reception over the wireless channel embraces the above-stated processing of the communication unit 410. According to various embodiments, the communication unit 410 may receive a signal for channel estimation, Also, the communication unit 410 may feed channel information (e.g., channel state information (CSI)) generated by the processor 420, to be explained, back to other device (e.g., the transmission device 110 of FIG. 1). Further, the communication unit 410 may receive data generated according to the channel information fed back to the other device. Through the communication unit 410, the reception device may perform signaling with the transmission device to determine a reception scheme. For example, the signaling may change at least one of coded modulation scheme information, bit-to-symbol mapping scheme information, channel change level information, and multiple input multiple output (MIMO) channel correlation information.

The processor 420 may control general operations of the reception device 120. For example, the processor 420 may transmit and receive signals through the communication unit 410. Also, the processor 420 may record and read data in and from the memory 430. For doing so, the processor 420 may include at least one processor or microprocessor, or may be configured as part of a processor. Part of the communication unit 410 and the processor 420 may be referred to as a communication processor (CP).

The processor 420 may be operably coupled with the communication unit 410 and the memory 430. The processor 420 may perform the operations of the reception device 120 according to various embodiments, by controlling the communication unit 410 and the memory 430 which are operably coupled therewith.

The memory 430 may stores a basic program for operating the reception device 120, an application program, and data such as setting information. The memory 430 may include a volatile memory, a non-volatile memory, or a combination of a volatile memory and a non-volatile memory. The memory 430 may provide the stored data in response to a request of the processor 420. According to various embodiments, the memory 430 may store precoders, to feed the channel information back to the transmission device 110.

FIG. 4 illustrates the configuration of the reception device 120. Herein, if the configuration of FIG. 4 is a configuration of a base station, it may further include a backhaul communication unit for providing an interface to communicate with a backhaul network.

Figure 5:
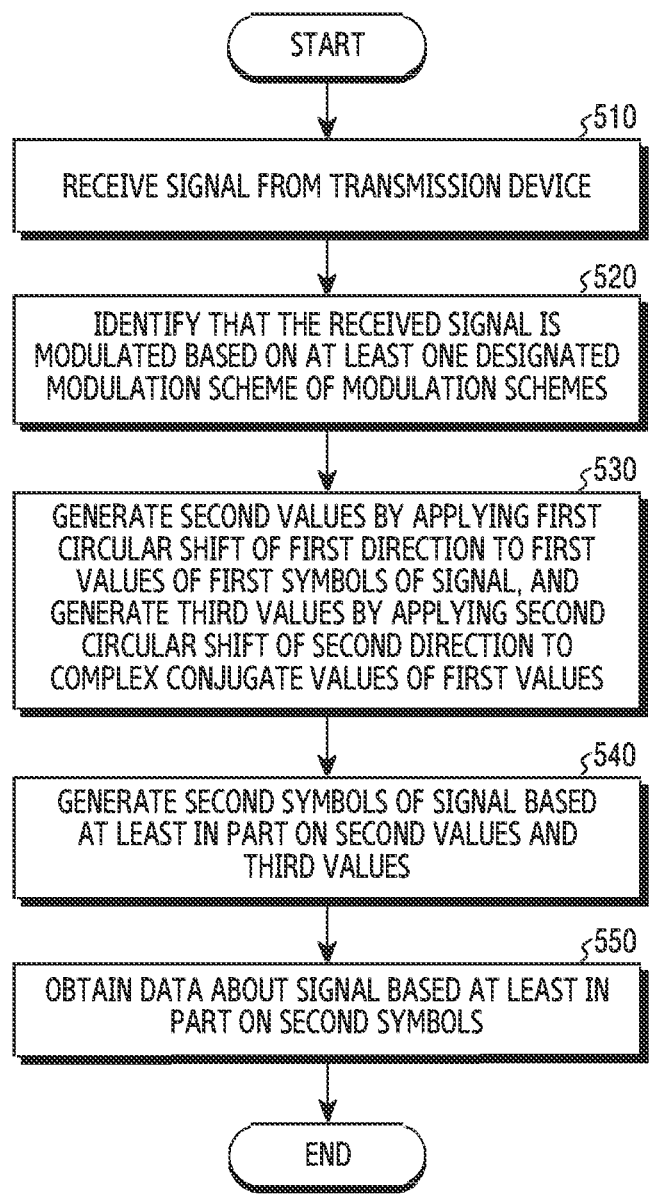
FIG. 5 illustrates an example of operations of a reception device according to various embodiments.

FIG. 5 illustrates an example of operations of a reception device according to various embodiments. The operations may be carried out by the reception device 120 of FIG. 1 or FIG. 4, or by at least one component (e.g., the communication unit 410, the processor 420, and the memory 430) of the reception device 120.

Figure 6:
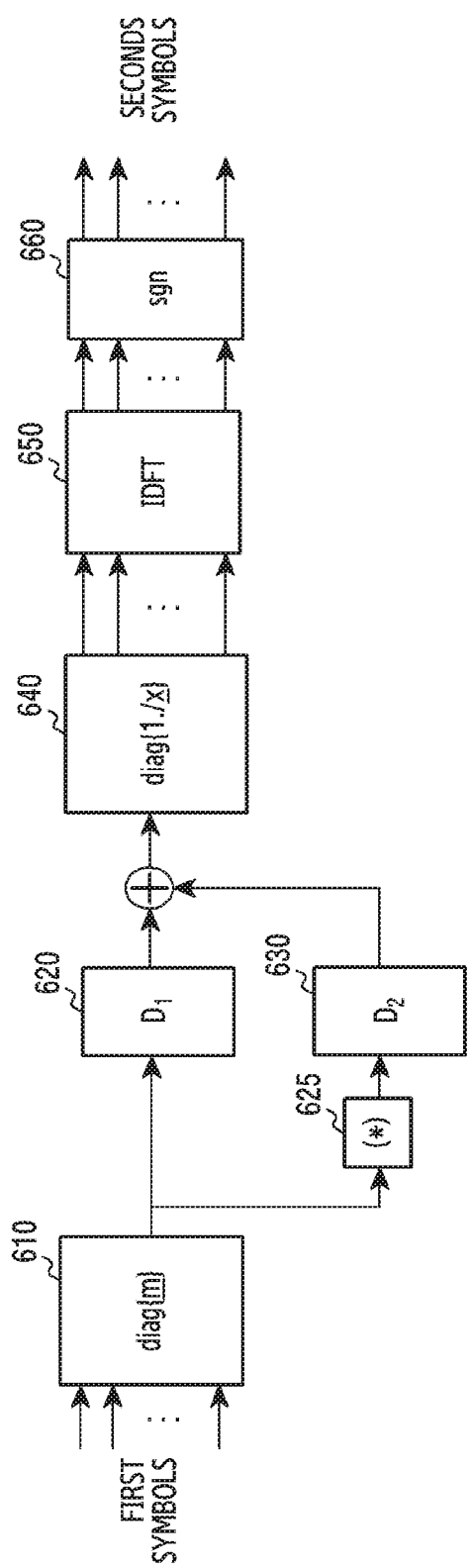
FIG. 6 illustrates an example of calculations of a reception device for processing a received signal according to various embodiments.

FIG. 6 illustrates an example of calculations of a reception device for processing a received signal according to various embodiments.

Referring to FIG. 5, in operation 510, the reception device 120 (or the processor 420) may receive a signal from the transmission device 110. In various embodiments, the signal may be modulated based on the BPSK or the π/2 BPSK. In various embodiments, the signal may be applied with the FDSS.

In operation 520, the reception device 120 may identify that the received signal is modulated based on at least one designated modulation scheme of modulation schemes. For example, the at least one designated modulation scheme may include one or more of the BPSK or the π/2 BPSK. In various embodiments, the reception device 120 may identify that the received signal is modulated based on the at least one designated modulation scheme, based on control information received from the transmission device 110 or a timing of the signal reception.

In operation 530, the reception device 120 may generate second values by applying a first circular shift of a first direction to first values of first symbols of the signal, and generate third values by applying a second circular shift of a second direction to complex conjugate values of the first values. The first symbols may be acquired by removing a cyclic prefix (CP) from the signal received from the transmission device 110 and applying discrete Fourier transform (DFT) of size N. The first values may be generated by processing the first symbols based on a channel gain between the transmission device 110 and the reception device 120 and a gain of the FDSS. For example, referring to FIG. 6, the reception device 120 may generate the first values by multiplying the first symbols by a diagonal matrix diag{m} 610. Diagonal components of the diagonal matrix 610 may be defined based on Equation 2.

$$m \triangleq [p^*_1 h^*_1 p^*_2 h^*_2 \ldots P^*_M h^*_M]^T \tag{2}$$

In Equation 2, $p_i$ may denote the FDSS gain applied to the subcarrier for an i-th symbol of the first symbols, $h_i$ may denote the channel gain for the i-th symbol of channels between the transmission device 110 and the reception device 120, * may indicate a complex conjugate value, and M may denote the number of subcarriers allocated to the reception device 120. For example, $p^*_2$ may denote the complex conjugate value of the FDSS gain applied to the subcarrier for the second symbol of the first symbols, among eight subcarriers allocated to the reception device 120, and $h^*_2$ may denote the complex conjugate value of the channel gain of the second symbol of the first symbols.

For example, if eight subcarriers are allocated to the reception device 120, a phase π/2 of the modulation scheme is applied to the signal, and the first symbols are $y_m$ (1≤m≤8), the reception device 120 may generate the first values based on Equation 3 by multiplying the first symbols by the diagonal matrix 610.

$$\begin{bmatrix} h^{**}_1 p^*_1 y_1 \\ h^{**}_2 p^*_2 y_2 \\ \vdots \\ h^*_8 p^*_8 y_8 \end{bmatrix} \tag{3}$$

The reception device 120 may generate the second values by applying the first circular shift of the first direction to the first values. For example, referring to FIG. 6, the reception device 120 may generate the second values by multiplying the first values by a matrix $D_1$ 620. For example, the matrix 620 may be defined based on Equation 4.

$$D_1 = \text{circshift}(I_L, -k) \tag{4}$$

In Equation 4, $I_L$ may denote a unit matrix where diagonal components are 1 and other components than the diagonal components are 0, and k may denote $$\frac{L\phi}{2\pi}.$$

Herein, L may denote the number of the subcarriers allocated to the reception device 120, and φ may denote the phase of the modulation scheme applied to the received signal.

In the example where the eight subcarriers are allocated to the reception device 120 and the phase π/2 of the modulation scheme is applied to the signal, k may be 2 and the matrix 620 determined based on Equation 4 may be expressed as Equation 5.

$$D_1 = \begin{pmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \end{pmatrix} \tag{5}$$

The reception device 120 may generate the second values of Equation 6 by multiplying the matrix 620 in FIG. 6 by the first values.

$$\begin{bmatrix} h^*_3 p^*_3 y_3 \\ h^*_4 p^*_4 y_4 \\ \vdots \\ h^*_8 p^*_8 y_8 \\ h^*_1 p^*_1 y_1 \\ h^*_2 p^*_2 y_2 \end{bmatrix} \tag{6}$$

The reception device 120 may obtain complex conjugate values of the first values. For example, referring to FIG. 6, the reception device 120 may acquire the complex conjugate values of the first values by applying a conjugate transpose * 625 to the first values.

The reception device 120 may generate the third values by multiplying the complex conjugate values of the first values by a matrix $D_2$ 630. For example, the matrix 630 may be defined based on Equation 7

$$D_2 = \text{circshift}(\text{flipud}(I_L), k+1) \tag{7}$$

In Equation 7, $I_L$ may denote the unit matrix where the diagonal components are 1 and other components than the diagonal components are 0, k may denote $$\frac{L\phi}{2\pi},$$

and flipud( ) may denote a function which flips $I_L$. Herein, L may denote the number of the subcarriers allocated to the reception device 120, and φ may denote the phase of the modulation scheme applied to the received signal.

In the example (L=8, φ=π/2), k may be 2 and the matrix 630 determined based on Equation 7 may be expressed as Equation 8.

$$D_2 = \begin{pmatrix} 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \end{pmatrix} \quad (8)$$

The reception device 120 may generate the third values of Equation 9 by multiplying the matrix 630 in FIG. 6 by the conjugate complex values of the first values.

$$\begin{bmatrix} h_3 p_3 y_3^* \\ h_2 p_2 y_2^* \\ h_1 p_1 y_1^* \\ h_8 p_8 y_8^* \\ h_7 p_7 y_7^* \\ \vdots \\ h_4 p_4 y_4^* \end{bmatrix} \quad (9)$$

In operation 540, the reception device 120 may generate the second symbols for the received signal based at least in part on the second values and the third values. For example, referring to FIG. 6, the reception device 120 may acquire fourth values based on Equation 10 by adding the second values and the third values.

$$\begin{bmatrix} h_3^* p_3^* y_3 \\ h_4^* p_4^* y_4 \\ \vdots \\ h_8^* p_8^* y_8 \\ h_1^* p_1^* y_1 \\ h_2^* p_2^* y_2 \end{bmatrix} + \begin{bmatrix} h_3 p_3 y_3^* \\ h_2 p_2 y_2^* \\ h_1 p_1 y_1^* \\ h_8 p_8 y_8^* \\ h_7 p_7 y_7^* \\ \vdots \\ h_4 p_4 y_4^* \end{bmatrix} = \begin{bmatrix} h_3^* p_3^* y_3 + h_3 p_3 y_3^* \\ h_4^* p_4^* y_4 + h_2 p_2 y_2^* \\ h_5^* p_5^* y_5 + h_1 p_1 y_1^* \\ \vdots \\ h_2^* p_2^* y_2 + h_4 p_4 y_4^* \end{bmatrix} \quad (10)$$

The reception device 120 may generate fifth values by processing the fourth values based on the matrix 620, the matrix 630, the channel gain between the transmission device 110 and the reception device 120, the FDSS gain, and a noise variance of the channel. For example, referring to FIG. 6, the reception device 120 may generate the fifth values by multiplying the fourth values by a diagonal matrix diag{1./$\underline{x}$} 640. In diagonal components of the diagonal matrix 640, $\underline{x}$ may be defined as Equation 11.

$$\underline{x} = (D_1 + D_2)\underline{v} + 2\sigma^2 \mathbf{1}_L \quad (11)$$

In Equation 11, $D_1$ may denote the matrix 620, $D_2$ may denote the matrix 630, $\underline{v}$ may denote $\underline{v} \triangleq [v_1 \ v_2 \ \ldots \ v_L]^T$, $\sigma^2$ may denote the noise variance of the channel between the transmission device 110 and the transmission device 110, and $\mathbf{1}_L$ may denote a unit matrix where diagonal components are 1 and other components than the diagonal components are 0.

Components of $\underline{v}$ may be defined based on Equation 12.

$$v_i \triangleq |p_i|^2 |h_i|^2 \forall 1 \le i \le L \quad (12)$$

In Equation 12, $v_i$ may denote an i-th component of the components of $\underline{v}$, $p_i$ may denote the FDSS gain applied to the subcarrier for the i-th component of the first symbols, $h_i$ may denote the channel gain for the i-th symbol, and L may denote the number of the subcarriers allocated to the reception device 120.

For example, in the example (L=8, φ=π/2), the reception device 120 may generate the fifth values based on Equation 13 by multiplying the fourth values by a diagonal matrix 640.

$$\begin{bmatrix} \dfrac{h_3^* p_3^* y_3 + h_3 p_3 y_3^*}{|h_3|^2 |p_3|^2 + |h_3|^2 |p_3|^2 + 2\sigma^2} \\ \dfrac{h_4^* p_4^* y_4 + h_2 p_2 y_2^*}{|h_4|^2 |p_4|^2 + |h_2|^2 |p_2|^2 + 2\sigma^2} \\ \dfrac{h_5^* p_5^* y_5 + h_1 p_1 y_1^*}{|h_5|^2 |p_5|^2 + |h_1|^2 |p_1|^2 + 2\sigma^2} \\ \vdots \\ \dfrac{h_2^* p_2^* y_2 + h_4 p_4 y_4^*}{|h_2|^2 |p_2|^2 + |h_4|^2 |p_4|^2 + 2\sigma^2} \end{bmatrix} \quad (13)$$

The reception device 120 may generate sixth values by applying inverse discrete Fourier transform (IDFT) of size L to the fifth values. For example, referring to FIG. 6, the reception device 120 may generate the sixth values based on Equation 14 by applying IDFT 650 to the fifth values.

$$W_L^H \begin{bmatrix} \dfrac{h_3^* p_3^* y_3 + h_3 p_3 y_3^*}{|h_3|^2 |p_3|^2 + |h_3|^2 |p_3|^2 + 2\sigma^2} \\ \dfrac{h_4^* p_4^* y_4 + h_2 p_2 y_2^*}{|h_4|^2 |p_4|^2 + |h_2|^2 |p_2|^2 + 2\sigma^2} \\ \dfrac{h_5^* p_5^* y_5 + h_1 p_1 y_1^*}{|h_5|^2 |p_5|^2 + |h_1|^2 |p_1|^2 + 2\sigma^2} \\ \vdots \\ \dfrac{h_2^* p_2^* y_2 + h_4 p_4 y_4^*}{|h_2|^2 |p_2|^2 + |h_4|^2 |p_4|^2 + 2\sigma^2} \end{bmatrix} \quad (14)$$

The reception device 120 may generate the second symbols based on the sixth values. For example, referring to FIG. 6, the reception device 120 may generate the second symbols by applying a signum function sgn( ) 660 to the sixth values.

In operation 550, the reception device 120 may obtain data about the received signal based at least in part on the second symbols. For example, the reception device 120 may acquire the data of the received signal by applying one or more of various determination schemes or various decoding schemes to the second symbols.

Although not depicted in FIG. 5, the reception device 120 may provide various services (e.g., call service, streaming service, Internet service, etc.) using the acquired data.

As such, the reception device 120 according to various embodiments may process the received signal according to the calculations of FIG. 5 or FIG. 6, and thus achieve the same performance as a reception device including a general widely linear minimum mean square error (WLMMSE) receiver and reduce complexity. For example, complexity of the reception device including the general WLMMSE receiver is $L^3$ due to an inverse matrix of size 2L (where L is the number of subcarriers allocated to the reception device), whereas the complexity of the reception device 120 including the WLMMSE receiver which performs the calculations (e.g., the calculations of FIG. 5 and FIG. 6) according to various embodiments may be L log L.

Figure 7:
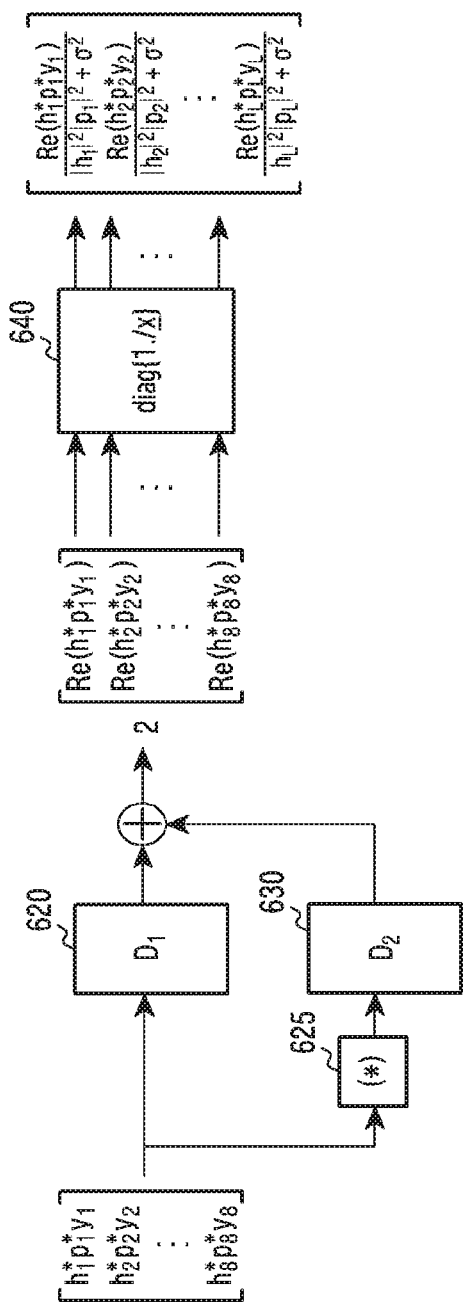
FIG. 7 illustrates an example of calculations of a reception device for processing a modulated signal based on BPSK according to various embodiments.

FIG. 7 illustrates an example of calculations of a reception device for processing a modulated signal based on BPSK according to various embodiments.

Referring to FIG. 7, the reception device 120 may receive a signal modulated based on BPSK on eight subcarriers allocated to the reception device 120. The reception device 120 may obtain the first symbols by removing a CP from the received signal and applying DFT of size N. The reception device 120 may generate the first values by multiplying the first symbols by a diagonal matrix 610.

The reception device 120 may generate the second values which are the same as the first values, by multiplying the first symbols by a unit matrix 620.

The reception device 120 may obtain complex conjugate values of the first values by multiplying the first values by a conjugate transpose 625. The reception device 120 may generate the third values which are the same as the complex conjugate values of the first values, by multiplying the complex conjugate values of the first symbols by a unit matrix 630.

The reception device 120 may generate the fourth values by adding the second values and the third values. Since the second values are the same as the first values and the third values are the same as the complex conjugate values of the first values, the fourth values may be defined based on Equation 15.

$$2\begin{bmatrix} \text{Re}(h_1^* p_1^* y_1) \\ \text{Re}(h_2^* p_2^* y_2) \\ \vdots \\ \text{Re}(h_8^* p_8^* y_8) \end{bmatrix} \quad (15)$$

The reception device 120 may generate fifth values based on Equation 16, by multiplying the fourth values by a diagonal matrix 640.

$$\begin{bmatrix} \dfrac{\text{Re}(h_1^* p_1^* y_1)}{|h_1|^2 |p_1|^2 + \sigma^2} \\ \dfrac{\text{Re}(h_2^* p_2^* y_2)}{|h_2|^2 |p_2|^2 + \sigma^2} \\ \vdots \\ \dfrac{\text{Re}(h_L^* p_L^* y_L)}{|h_L|^2 |p_L|^2 + \sigma^2} \end{bmatrix} \quad (16)$$

Figure 8:
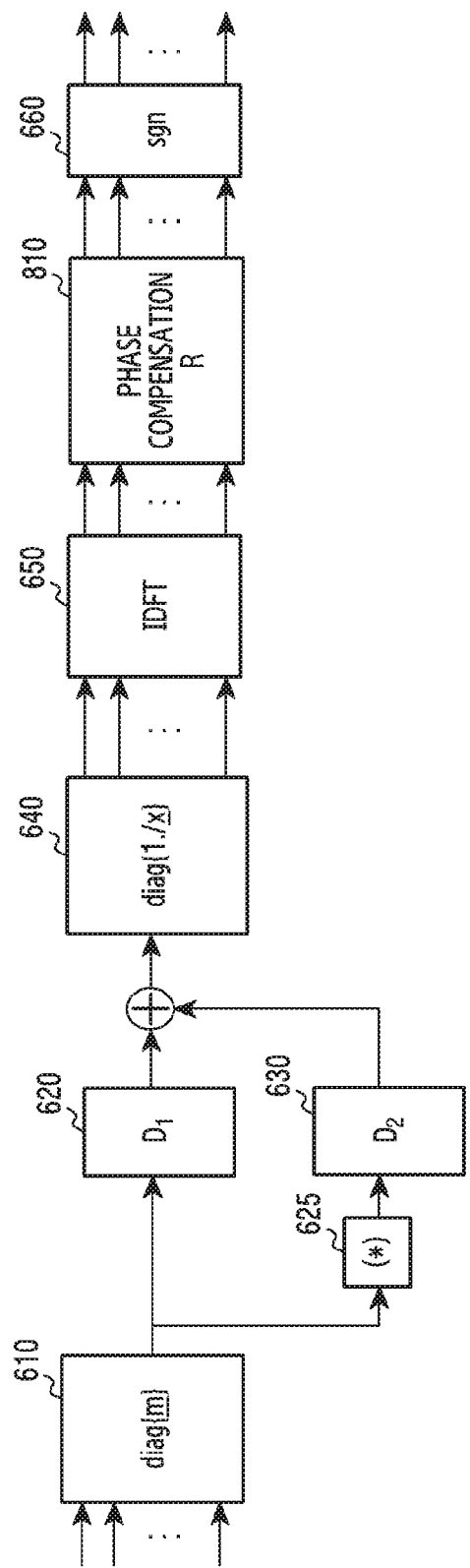
FIG. 8 illustrates an example of calculations of a reception device for processing a signal modulated based on π/2 BPSK according to various embodiments.

FIG. 8 illustrates an example of calculations of a reception device for processing a signal modulated based on π/2 BPSK according to various embodiments.

Referring to FIG. 8, the reception device 120 may receive a signal modulated based on π/2 BPSK on eight subcarriers allocated to the reception device 120. The reception device 120 may obtain the first symbols by removing a CP from the received signal and applying DFT of size N. The reception device 120 may generate the first values by multiplying the first symbols by a diagonal matrix 610.

The reception device 120 may generate the second values by multiplying the first symbols by a matrix 620, and generate the third values by multiplying complex conjugate values of the first values by a matrix 630.

The reception device 120 may generate the fourth values by adding the second values and the third values. The reception device 120 may generate the fifth values by multiplying the fourth values by a diagonal matrix 640.

The reception device 120 may generate the sixth values by applying IDFT of size L to the fifth values.

The reception device 120 may generate seventh values by reversely rotating the sixth values. To compensate for the symbols rotated by π/2 according to the π/2 BPSK, The reception device 120 may multiply the sixth values by a phase compensation diagonal matrix R 810.

For example, if the received signal is modulated with the same π/2 BPSK as the constellation 200 of FIG. 2, the phase compensation diagonal matrix 810 may be defined as Equation 17.

$$R = \text{diag}\{\underline{r}\} \quad \underline{r} = \begin{bmatrix} e^{-j\frac{\pi}{2} \cdot 0} \\ j e^{-j\frac{\pi}{2} \cdot 1} \\ e^{-j\frac{\pi}{2} \cdot 2} \\ j e^{-j\frac{\pi}{2} \cdot 3} \\ \vdots \\ e^{-j\frac{\pi}{2} \cdot (L-2)} \\ j e^{-j\frac{\pi}{2} \cdot (L-1)} \end{bmatrix} \begin{bmatrix} 1 \\ 1 \\ -1 \\ -1 \\ 1 \\ 1 \\ \vdots \\ -1 \\ -1 \end{bmatrix} \quad (17)$$

For example, if the received signal is modulated with the same π/2 BPSK as the constellation 250 of FIG. 2, the phase compensation diagonal matrix 810 may be defined as Equation 18.

$$R = \text{diag}\{\underline{r}\} \quad \underline{r} = e^{-j\frac{\pi}{4}} \begin{bmatrix} e^{-j\frac{\pi}{2} \cdot 0} \\ j e^{-j\frac{\pi}{2} \cdot 1} \\ e^{-j\frac{\pi}{2} \cdot 2} \\ j e^{-j\frac{\pi}{2} \cdot 3} \\ \vdots \\ e^{-j\frac{\pi}{2} \cdot (L-2)} \\ j e^{-j\frac{\pi}{2} \cdot (L-1)} \end{bmatrix} \begin{bmatrix} 1 \\ 1 \\ -1 \\ -1 \\ 1 \\ 1 \\ \vdots \\ -1 \\ -1 \end{bmatrix} = e^{-j\frac{\pi}{4}} \begin{bmatrix} 1 \\ 1 \\ -1 \\ -1 \\ 1 \\ 1 \\ \vdots \\ -1 \\ -1 \end{bmatrix} \quad (18)$$

In other words, the reception device 120 may generate the seventh values by compensating for the sixth values by the phase rotated by the π/2 BPSK.

The reception device 120 may generate the second symbols by applying the signum function 660 to the seventh values.

According to various embodiments, a method of a reception device in a wireless environment may include receiving a signal from a transmission device, identifying that the received signal is modulated based on at least one designated modulation scheme of modulation schemes, based on identifying, generating second values by applying a first circular shift of a first direction to first values relating to first symbols of the signal, and generating third values by applying a second circular shift of a second direction which is different from the first direction, to complex conjugate values of the first values, generating second symbols of the signal based at least in part on the second values and the third values, and obtaining data about the signal based at least in part on the second symbols.

In various embodiments, the at least one designated modulation scheme may be related to one or more of BPSK or BPSK which is shifted by π/2. For example, the signal received from the transmission device may be applied with FDSS. In some embodiments, the method may further include, in response to identifying, generating the first values by processing the first symbols based on a channel gain between the transmission device and the reception device and an FDSS gain. In some embodiments, generating the second symbols may include generating fourth values by adding the second values and the third values, generating fifth values by processing the fourth values based on a first matrix for the first circular shift, a second matrix for the second circular shift, the channel gain, the FDSS gain, and a noise variance of the channel, and generating the second symbols based at least in part on the fifth values. For example, the signal may be received on a plurality of subcarriers from the transmission device, the first symbols may be related to the subcarriers respectively, and the first values each may be generated by multiplying the first symbols by a complex conjugate value of the FDSS gain applied to the subcarrier relating to each of the first symbols and a complex conjugate value of the channel gain for each of the first symbols. For example, the fifth values may be generated by the fourth values by Equation 19.

$$\frac{1}{(D_1 + D_2)|p_i|^2|h_i|^2 + 2\sigma^2 I} \quad (19)$$

In Equation 19, $D_1$ may denote the first matrix, $D_2$ may denote the second matrix, $p_i$ may denote the FDSS gain applied to the subcarrier relating to an i-th value of the fourth values, $h_i$ may denote the channel gain for the i-th value of the fourth values, $\sigma^2$ may denote the noise variance of the channel, and I may denote a unit matrix.

For example, generating the second symbols may include generating sixth values by reversely rotating the fifth values by a phase of the modulation scheme of the signal, and generating the second symbols based at least in part on the generated sixth values.

In various embodiments, generating the second values and the third values may include generating the second values by multiplying the first values by a first matrix which circular shifts by k in the first direction, and generating the third values by multiplying complex conjugate values of the first values by a second matrix which flips the first values and circular shifts by k+1 in the second direction, wherein k may be determined based on the modulation scheme of the signal and a phase of the signal modulation scheme.

In various embodiments, the at least one receiver may include a WLMMSE receiver.

According to various embodiments, a reception device in a wireless environment may include at least one receiver, and at least one processor operatively coupled with the at least one receiver and configured to receive a signal from a transmission device, to identify that the received signal is modulated based on at least one designated modulation scheme of modulation schemes, based on identifying, to generate second values by applying a first circular shift of a first direction to first values relating to first symbols of the signal, and to generate third values by applying a second circular shift of a second direction which is different from the first direction, to complex conjugate values of the first values, to generate second symbols of the signal based at least in part on the second values and the third values, and to obtain data about the signal based at least in part on the second symbols.

In various embodiments, the at least one designated modulation scheme may be related to one or more of BPSK or BPSK which is shifted by π/2. For example, the signal received from the transmission device may be applied with FDSS. For example, in response to identifying, the at least one processor may be further configured to generate the first values by processing the first symbols based on a channel gain between the transmission device and the reception device and an FDSS gain. For example, the at least one processor may be configured to generate fourth values by adding the second values and the third values, to generate fifth values by processing the fourth values based on a first matrix for the first circular shift, a second matrix for the second circular shift, the channel gain, the FDSS gain, and a noise variance of the channel, and to generate the second symbols based at least in part on the fifth values. For example, the signal may be received on a plurality of subcarriers from the transmission device, the first symbols may be related to the subcarriers respectively, and the first values each may be generated by multiplying the first symbols by a complex conjugate value of the FDSS gain applied to the subcarrier relating to each of the first symbols and a complex conjugate value of the channel gain for each of the first symbols. For example, the fifth values may be generated by the fourth values by Equation 19. For example, the at least one processor may be configured to generate sixth values by reversely rotating the fifth values by a phase of the modulation scheme of the signal, and to generate the second symbols based at least in part on the generated sixth values.

In various embodiments, the at least one processor may be configured to generate the second values by multiplying the first values by a first matrix which circular shifts by k in the first direction, and to generate the third values by multiplying complex conjugate values of the first values by a second matrix which flips the first values and circular shifts by k+1 in the second direction, wherein k may be determined based on the modulation scheme of the signal and a phase of the signal modulation scheme.

In various embodiments, the at least one receiver may include a WLMMSE receiver.

The methods according to the embodiments described in the claims or the specification of the present disclosure may be implemented in software, hardware, or a combination of hardware and software.

If implementing in software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. Also, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. The storage device may access the apparatus which implements the embodiment of the present disclosure through an external port. Also, a separate storage device may access the apparatus which implements the embodiment of the present disclosure over the communication network.

In the specific embodiments of the present disclosure, the elements included in the disclosure are expressed in a singular or plural form according to the specific embodiment. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has explained specific embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a reception device in a wireless communication system, comprising:
   receiving a signal from a transmission device;
   identifying that the received signal is modulated based on at least one designated modulation scheme of modulation schemes;
   generating second values by applying a first circular shift of a first direction to first values relating to first symbols of the signal;
   generating third values by applying a second circular shift of a second direction which is different from the first direction to complex conjugate values of the first values;
   generating second symbols of the signal based on at least one of the second values and at least one of the third values; and
   obtaining data for the signal based on the second symbols.

2. The method of claim 1, wherein the at least one designated modulation scheme is related to one or more of binary phase shift keying (BPSK) or BPSK which is shifted by $\pi/2$.

3. The method of claim 2, wherein the signal received from the transmission device is applied with frequency domain spectrum shaping (FDSS).

4. The method of claim 3, further comprising:
   in response to the identifying, generating the first values by processing the first symbols based on a channel gain between the transmission device and the reception device and an FDSS gain.

5. The method of claim 4, wherein generating the second symbols comprises:
   generating fourth values by adding the second values and the third values;
   generating fifth values by processing the fourth values based on a first matrix for the first circular shift, a second matrix for the second circular shift, the channel gain, the FDSS gain, and a noise variance of a channel; and
   generating the second symbols based on at least one of the fifth values.

6. The method of claim 5, wherein generating the first values comprises:
   receiving the signal on a plurality of subcarriers from the transmission device; and
   generating each of the first values by multiplying each of the first symbols by a complex conjugate value of the FDSS gain applied to the subcarrier relating to each of the first symbols and a complex conjugate value of the channel gain for each of the first symbols, and
   wherein each of the first symbols is related to each of the plurality of subcarriers, respectively.

7. The method of claim 6, wherein the fifth values are generated by multiplying the fourth values by the following equation:

$$\frac{1}{(D_1 + D_2)|p_i|^2|h_i|^2 + 2\sigma^2 I}$$

where $D_1$ denotes the first matrix, $D_2$ denotes the second matrix, $p_i$ denotes the FDSS gain applied to a subcarrier relating to an i-th value of the fourth values, $h_i$ denotes the channel gain for the i-th value of the fourth values, $\sigma^2$ denotes the noise variance of the channel, and I denotes a unit matrix.

8. The method of claim 7, wherein generating the second symbols further comprises:
   generating sixth values by reversely rotating the fifth values by a phase of the at least one designated modulation scheme of the signal; and
   generating the second symbols based on at least one of the generated sixth values.

9. The method of claim 1, wherein generating the second values and generating the third values further comprises:
   generating the second values by multiplying the first values by a first matrix which circular shifts by k in the first direction; and
   generating the third values by multiplying complex conjugate values of the first values by a second matrix which flips the first values and circular shifts by k+1 in the second direction, and
   wherein the k is determined based on the at least one designated modulation scheme of the signal a phase of the at least one designated modulation scheme.

10. The method of claim 1, wherein the signal is received by a widely linear minimum mean square error (WLMMSE) receiver.

11. A reception device in a wireless communication system, comprising:
    at least one receiver; and
    at least one processor operatively coupled with the at least one receiver,
    wherein the at least one processor is configured to:
    receive a signal from a transmission device;
    identify that the received signal is modulated based on at least one designated modulation scheme of modulation schemes;
    generate second values by applying a first circular shift of a first direction to first values relating to first symbols of the signal;
    generate third values by applying a second circular shift of a second direction which is different from the first direction to complex conjugate values of the first values;
    generate second symbols of the signal based on at least one of the second values and at least one of the third values; and obtain data for the signal based on at least one of the second symbols.

12. The reception device of claim 11, wherein the at least one designated modulation scheme is related to one or more of binary phase shift keying (BPSK) or BPSK which is shifted by π/2.

13. The reception device of claim 12, wherein the signal received from the transmission device is applied with frequency domain spectrum shaping (FDSS).

14. The reception device of claim 13, wherein, in response to the identifying, the at least one processor is further configured to generate the first values by processing the first symbols based on a channel gain between the transmission device and the reception device and an FDSS gain.

15. The reception device of claim 14, wherein the at least one processor is, in order to generate the second symbols, configured to:
generate fourth values by adding the second values and the third values;
generate fifth values by processing the fourth values based on a first matrix for the first circular shift, a second matrix for the second circular shift, the channel gain, the FDSS gain, and a noise variance of a channel; and
generate the second symbols based on at least one of the fifth values.

16. The reception device of claim 15, wherein the at least one processor is, in order to generate the first values, configured to:
receive the signal on a plurality of subcarriers from the transmission device; and
generate each of the first values by multiplying each of the first symbols by a complex conjugate value of the FDSS gain applied to the subcarrier relating to each of the first symbols and a complex conjugate value of the channel gain for each of the first symbols, and
wherein each of the first symbols is related to each of the plurality of subcarriers, respectively.

17. The reception device of claim 16, wherein the fifth values are generated by multiplying the fourth values by the following equation:

$$\frac{1}{(D_1 + D_2)|p_i|^2|h_i|^2 + 2\sigma^2 I}$$

where $D_1$ denotes the first matrix, $D_2$ denotes the second matrix, $p_i$ denotes the FDSS gain applied to a subcarrier relating to an i-th value of the fourth values, $h_i$ denotes the channel gain for the i-th value of the fourth values, $\sigma^2$ denotes the noise variance of the channel, and I denotes a unit matrix.

18. The reception device of claim 17, wherein the at least one processor is, in order to generate the second symbols, further configured to:
generate sixth values by reversely rotating the fifth values by a phase of the at least one designated modulation scheme of the signal; and
generating the second symbols based on at least one of the generated sixth values.

19. The reception device of claim 11, wherein the at least one processor is, in order to generate the second values and generate the third values, further configured to:
generate the second values by multiplying the first values by a first matrix which circular shifts by k in the first direction; and
generate the third values by multiplying complex conjugate values of the first values by a second matrix which flips the first values and circular shifts by k+1 in the second direction, and
wherein the k is determined based on the at least one designated modulation scheme of the signal a phase of the at least one designated modulation scheme.

20. The reception device of claim 11, wherein the at least one receiver comprises a widely linear minimum mean square error (WLMMSE) receiver.

* * * * *